US007708093B1

(12) United States Patent
Baker

(10) Patent No.: US 7,708,093 B1
(45) Date of Patent: May 4, 2010

(54) MOTORIZED WHEELCHAIR WITH STAND-UP CAPABILITY

(76) Inventor: Russell Marvin Baker, 9310 Syndicate Rd., Lexington, MN (US) 55014

(*) Notice: Subject to any disclaimer, the term of this patent is extended or adjusted under 35 U.S.C. 154(b) by 1365 days.

(21) Appl. No.: 11/148,136

(22) Filed: Jun. 8, 2005

(51) Int. Cl.
*B60K 1/00* (2006.01)
*A61G 5/10* (2006.01)

(52) U.S. Cl. .................................. 180/65.1; 280/304.1

(58) Field of Classification Search ................. 403/160; 180/65.1, 65.5; 297/DIG. 4
See application file for complete search history.

(56) References Cited

U.S. PATENT DOCUMENTS

| | | | | |
|---|---|---|---|---|
| 695,022 | A * | 3/1902 | Albertson | 285/185 |
| 2,630,114 | A * | 3/1953 | Hart | 600/193 |
| 3,185,495 | A * | 5/1965 | Pivacek | 280/657 |
| 3,379,450 | A * | 4/1968 | Jones et al. | 280/657 |
| 3,907,051 | A * | 9/1975 | Weant et al. | 180/6.2 |
| 4,119,164 | A | 10/1978 | Fogg et al. | |
| 4,523,769 | A * | 6/1985 | Glaser et al. | 280/252 |
| 4,623,194 | A * | 11/1986 | Pillot | 297/316 |
| 4,759,240 | A * | 7/1988 | Lin | 81/177.8 |
| 5,096,008 | A | 3/1992 | Mankowski | |
| 5,108,202 | A * | 4/1992 | Smith | 297/330 |
| 5,137,102 | A | 8/1992 | Houston, Sr. et al. | |
| 5,326,063 | A * | 7/1994 | Stevens | 248/282.1 |
| 5,342,116 | A * | 8/1994 | Walton | 297/466 |
| 5,366,036 | A | 11/1994 | Perry | |
| 5,606,851 | A * | 3/1997 | Bruener et al. | 56/11.9 |
| 5,689,852 | A * | 11/1997 | Svoboda et al. | 15/405 |
| 5,987,803 | A * | 11/1999 | White | 43/21.2 |
| 6,053,519 | A | 4/2000 | Poindexter et al. | |
| 6,086,157 | A * | 7/2000 | Toso | 297/423.11 |
| 6,123,162 | A * | 9/2000 | Rodriguez et al. | 180/8.3 |
| 6,125,957 | A | 10/2000 | Kauffmann | |
| 6,182,992 | B1 * | 2/2001 | Garven, Jr. | 280/250.1 |
| 6,220,556 | B1 * | 4/2001 | Sohrt et al. | 248/279.1 |
| 6,231,067 | B1 | 5/2001 | Johnson et al. | |
| 6,247,718 | B1 * | 6/2001 | Gobbers et al. | 280/304.1 |
| 6,561,549 | B1 * | 5/2003 | Moris et al. | 285/184 |
| 6,568,762 | B2 * | 5/2003 | Porcheron | 297/466 |
| 6,688,571 | B1 * | 2/2004 | Pauls | 248/282.1 |
| 6,877,687 | B2 * | 4/2005 | Moon et al. | 242/390.8 |
| 6,923,278 | B2 * | 8/2005 | Mulhern et al. | 180/65.1 |

FOREIGN PATENT DOCUMENTS

| | | | | |
|---|---|---|---|---|
| GB | 2135183 | A | * | 8/1984 |
| JP | 09224978 | A | * | 9/1997 |

* cited by examiner

*Primary Examiner*—Lesley Morris
*Assistant Examiner*—Chiedu A Chibogu
(74) *Attorney, Agent, or Firm*—David A. Winters

(57) ABSTRACT

A motorized wheelchair machine with stand-up support capability having independent front drive motors and wheels, drive wheels with axle centerline in vicinity of arches of user's feet, allowing more instinctive and natural maneuvering, simplified lift system using a linear actuator and collapsing parallelogram lifting frame design, for reduced cost and greater comfort. A preferred embodiment includes an onboard electrical cell charger, extendable and retractable charger cord compatible with standard household electrical outlets and an interlock switch that prevents use of the drive motors while charger is plugged into an electrical power receptacle and a novel leg-brace device.

17 Claims, 5 Drawing Sheets

MOTORIZED WHEELCHAIR WITH STAND-UP CAPABILITY

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of wheelchairs and more specifically to a motorized wheelchair machine with stand-up capability.

The field is crowded and comprises many variations on the common theme, that of wheelchairs with stand-up support capability. A number of representative designs are discussed in the following paragraphs.

U.S. Pat. No. 4,119,164 (Fogg. Jr., et al) teaches a long wheel base motorized wheelchair with stand-up capability. The design suffers from lack of maneuverability due to the fact that its drive wheels extend out in front of the chassis beyond the toes of the user. Because the drive axle is not physically beneath the user's feet, but is in front of them, it requires turning space of twice its own length to pivot around. This also makes it poorly adapted for fitting into space on public transport or private vehicles.

U.S. Pat. No. 5,096,008 (Manowski) teaches a three wheeled, motorized wheel chair. The drive wheels and entire drive system for the chair are located in front of the seated user. The design suffers from maneuverability disadvantages due to the long wheel base and is also, due to this length, poorly compatible with public and private transport.

Additionally, the armrests, as taught, extend in front of the unit, both in standing and in sitting position. In this, they comprise a potential obstruction to performing day to day tasks such as operating equipment and vehicles.

U.S. Pat. No. 5,137,102 (Houston, et al) teaches a motorized wheel chair with stand-up capability. The drive wheels and entire drive system for the chair are located in front of the user's toes and shins. The design suffers from a lack of maneuverability due to this feature in that the vertical axis about which it may pivot lies in front of the user. As a result it requires a space of at least twice its own length to pivot around this axis. Such maneuvering limitation is a disadvantage particularly in compatibility with public and private transport.

U.S. Pat. No. 5,366,036 (Perry) describes a motorized wheel chair having a drive axis behind the user's feet. As a result of this drive wheel location, the pivot turning axis lies behind the user, so that when the user undertakes to turn around, he actually swings in a circle, facing outward outside this axis of rotation. Additionally, the armrest mounted control station cannot be folded down, out of the way. It extends only forward or to the side, thus remaining a potential obstruction.

U.S. Pat. No. 6,125,957 (Kauffmann) teaches a motorized wheelchair with stand-up capability, wherein the drive wheels are located behind the user (i.e., the two rear wheels). As a result of the drive wheel location, the pivot turning axis lies behind the user, such that when the user undertakes to turn around, he actually swings around a circle outside his axis of rotation. So configured, this presents a maneuvering disadvantage in that the space required to pivot around is twice the physical length of the device. Additionally, the armrests extend rigidly forward, presenting potential obstacles to approaching equipment to be operated or other task locations.

U.S. Pat. No. 6,053,519 (Poindexter, et al) describes a motorized wheel chair with stand-up capability. It is configured with the drive wheels in front of the user, and also has a tower structure in front of the user, upon which the control console is located. So configured, this design presents significant obstacles interfering with the user's access to the area in front of him/her. For the user to approach a wash basin, window, or wall mounted control panel, for example, is very difficult, if not impossible. Also because the drive wheels are located in front of the user, when the user undertakes to turn around, he/she actually swings around a circle outside the axis of rotation. This tends to result in the user coming to rest at excessive distance from the target toward which he/she is turning.

U.S. Pat. No. 6,231,067 B1 (Johnson, et al.) describes a motorized wheel chair with stand-up capability. The seat pivots upward on an off-set hinge-like shaft arrangement at its front edge. The chair is equipped with armrests that extent forward or fold upward. No provision is made to have accessible means of chair control in all positions.

BRIEF SUMMARY OF THE INVENTION

Objects

A primary object of the invention is to allow the user to assume and maintain a standing position.

Another object of the invention is to allow the user to be mobile while in a standing position.

Yet another object of the invention is to allow the user to maneuver in tight quarters.

Another object of the invention is to allow the user greater ease in boarding, and controlling transportation systems, by introducing improved maneuvering capabilities, compact wheel base, low center of gravity and unobstructed frontal area.

Another object of the invention is to allow the user to approach objects or vertical surfaces in front of him/her while presenting no obstruction between the user and the object or surface.

A further object of the invention is allow the user to retain access to the system control console while also allowing the control console to be folded out of the way.

Yet another object of the invention is simple design, thereby minimizing manufacturing cost.

Still yet another object of the invention is to allow more comfortable and natural maneuvering by locating the drive axle center-line near arches of user's feet.

Another object of the invention is to allow the system to recharge at any standard electrical outlet due to onboard battery charger and compatible batteries.

A further object of the invention is to protect the user from driving away from a recharging outlet while still plugged-in by including a safety interlock switch.

Yet another object of the invention to provide a back rest that automatically adjusts to a properly upright orientation when the user transitions to a standing position.

Still yet another object of the invention is to allow a user to maintain a comfortable, upright stance for long periods by comfortably and firmly holding user's legs in place.

BRIEF SUMMARY OF THE INVENTION

Advantages

In accordance with a preferred embodiment of the invention, there is disclosed a motorized wheelchair machine with stand-up capability, using independent front drive motors and wheels with axle centerline in vicinity of arches of user's feet, allowing more instinctive and natural maneuvering, and a compact, simplified lift system using a collapsing parallelogram and linear actuator that reduces shearing action against the users body. The system is configured so as to eliminate or make retractable, forward extending armrests, control consoles, support plates, drive systems, or other obstacles that tend to block the ability of the user to make frontal, close approach to walls, tables, desks, or wash basins, etc, The system also incorporates a novel leg-brace design that, after one initial fitting, may be opened or rigidly closed with no further adjustment and no need of any latch mechanism (that might fail) for holding it closed.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

LISTS OF FIGURES AND NUMBERED COMPONENTS

FIG. 1

Figure 1:
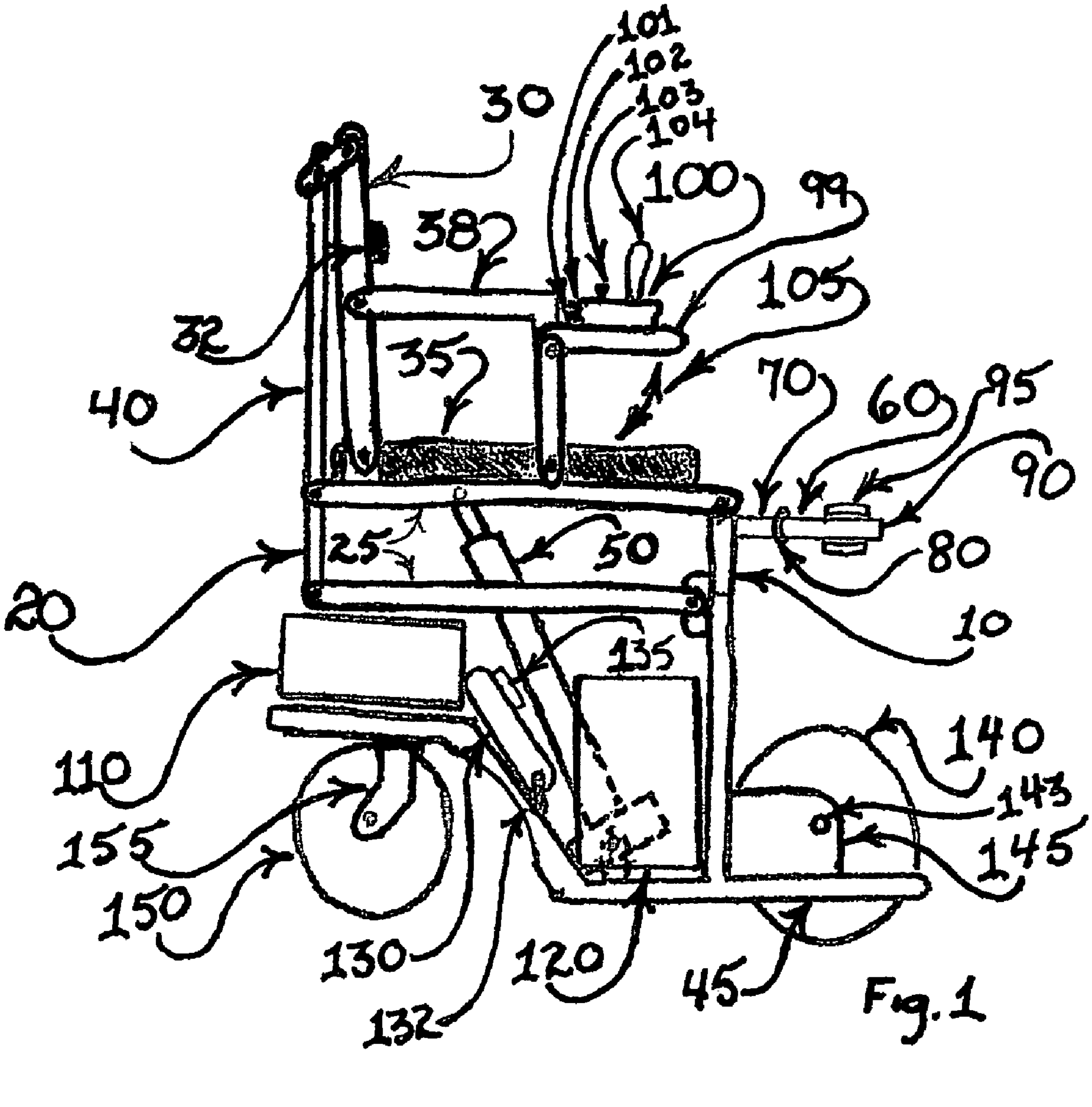
FIG. 1 is a side view of the device in seated configuration. Both right hand wheels and the right hand leg brace are removed to present a more informative picture.

10 lift frame, short side, fore
20 lift frame, short side, aft
25 lift frame, long sides
30 backrest
32 support belt
35 seat
38 arm rest
40 extension support for backrest

45 foot rest
50 linear actuator
60 leg-brace, distal shaft
70 leg-brace, proximal shaft
80 interface of leg-brace distal shaft and proximal shaft
90 leg brace
95 leg-brace pad
99 control console arm
100 control console
101 on/off switch
102 speed control knob
103 chair lift switch
104 joystick
105 adjustment directions of control console
110 electrical cell
120 electrical cell charger
130 electrical cord reel with automatic spring rewind
132 electrical power cord
135 electrical safety interlock
140 drive wheel
143 drive-wheel axle axis
145 independently controllable drive motor
150 caster mounted rear wheel
155 caster mount

FIG. 2

10 lift frame, short side, fore
20 lift frame, short side, aft
25 lift frame, long sides
30 backrest
32 support belt
35 seat
38 arm rest
40 extension support for backrest
45 foot support
50 linear actuator
60 leg-brace, distal shaft
70 leg-brace, proximal shaft
80 interface of leg-brace distal shaft and proximal shaft
90 knee brace
95 leg-brace pad
99 control console arm
100 control console
103 chair lift switch
104 joystick
110 electrical cell
120 electrical cell charger
130 electrical cord reel with automatic spring rewind
132 electrical power cord
135 electrical safety interlock
140 drive wheel
143 drive-wheel axle axis
145 independently controllable drive motor
150 caster mounted rear wheel
155 caster mount

FIG. 3

30 backrest
32 support belt
35 seat
38 arm rest
45 foot support
50 linear actuator
60 leg-brace, distal shaft
70 leg-brace, proximal shaft
80 interface of leg-brace distal shaft and proximal shaft
90 leg brace
95 leg-brace pad

Figure 4:
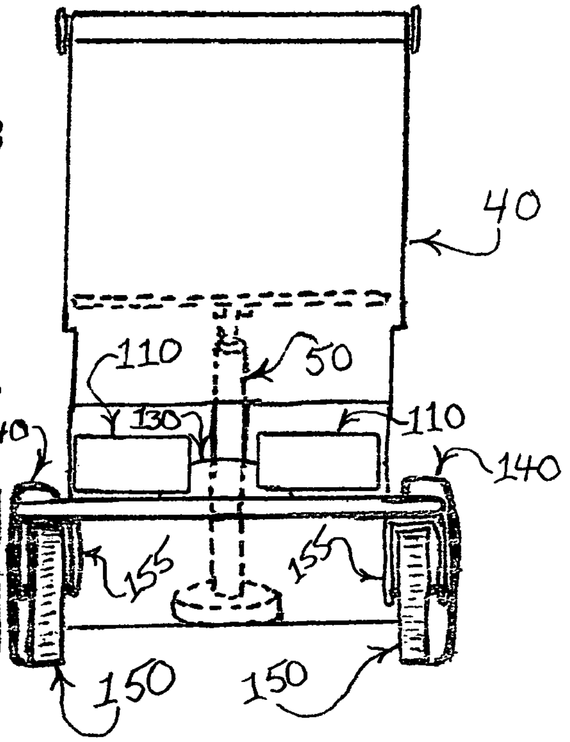
FIG. 4 is a front view of the device with the linear actuator wholly illustrated inclusive of its hidden parts, depicted by dotted lines.
Figure 5:
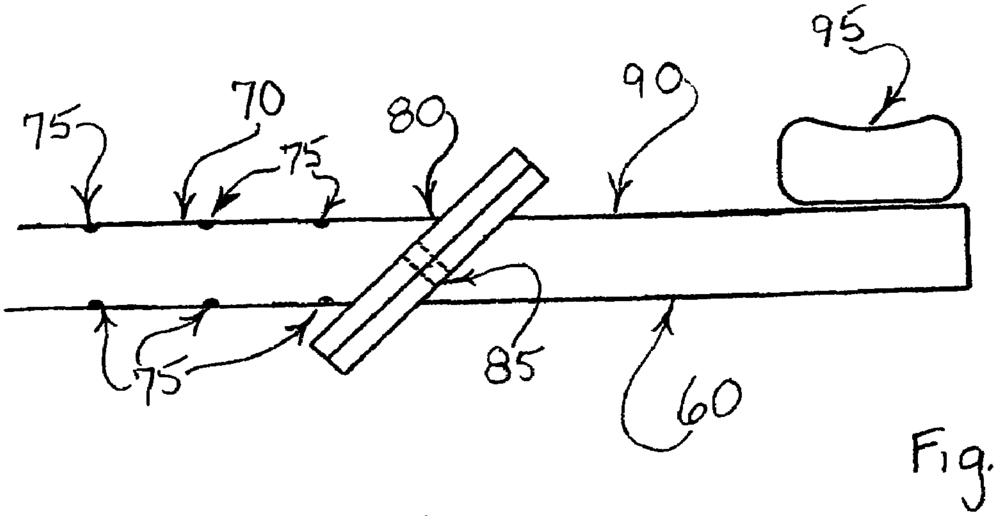
FIG. 5 is a top view of the left side leg brace in open position and showing the axle depicted by dotted lines.
Figure 6:
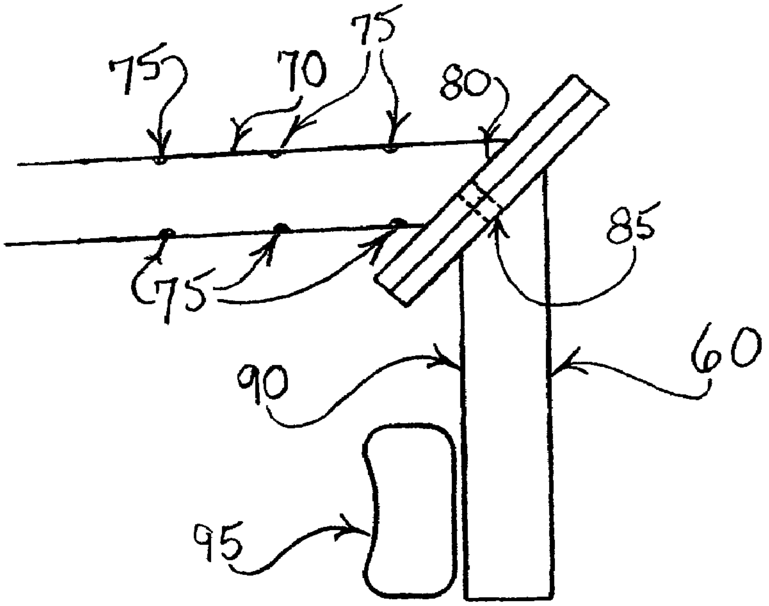
FIG. 6 is a top view of the left hand (larboard) side leg brace rotated to closed position and showing the axle depicted by dotted lines.
Figure 7:
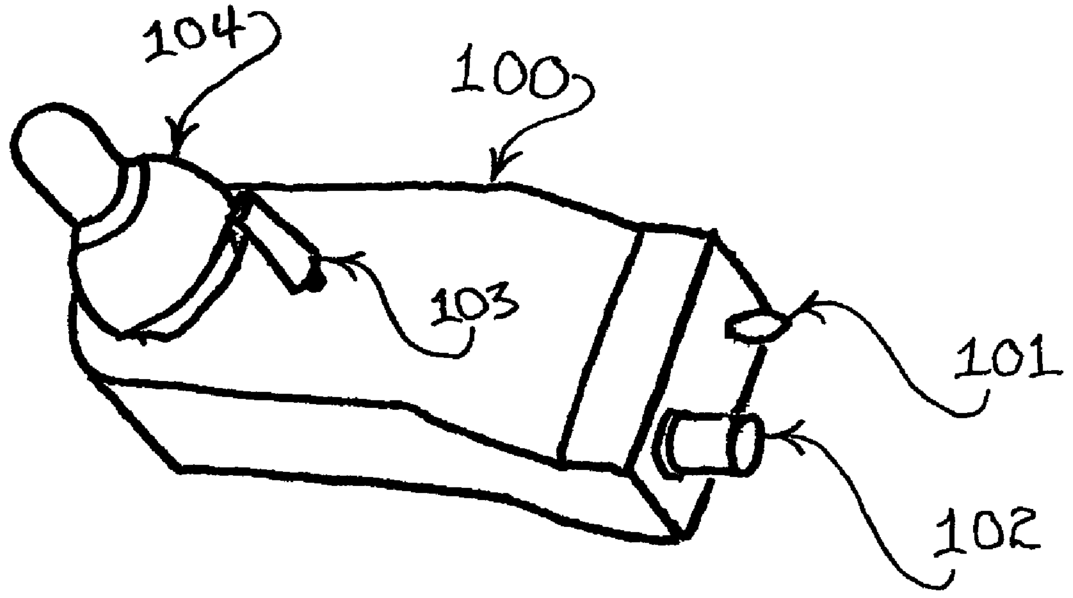
FIG. 7 is a three-quarter view of the control console.

99 control console arm
100 control console
105 adjustment directions of control console
140 drive wheel
145 independently controllable drive motor FIG. 4
40 extension support for backrest
50 linear actuator
110 electrical cell
130 electrical cord reel with automatic spring rewind
140 drive wheel
150 caster mounted rear wheel
155 caster mount FIG. 5
60 leg-brace, distal shaft
70 leg-brace, proximal shaft
75 mounting holes
80 interface of leg-brace distal shaft and proximal shaft
85 brace axle
90 leg brace
95 leg-brace pad FIG. 6
60 leg-brace, distal shaft
70 leg-brace, proximal shaft
75 mounting holes
80 interface of leg-brace distal shat and proximal shaft
85 brace axle
90 leg brace
95 leg-brace pad FIG. 7
100 control console
101 on/off switch
102 speed control knob
103 seat lift switch
104 joy stick

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Referring first to FIG. 1, there is illustrated a motorized wheelchair machine with stand up capability. The system is propelled through joystick (104) controlled, independent front drive motors (145) and wheels that share an axle axis (143) in vicinity of the arches of the user's feet. This axle (143) location allows the user to maneuver, when in standing position, in a natural manner in that user's turning axis is approximately the same as if the user were standing, unaided, without the wheelchair.

In order to enhance stability, the chair is ballasted to counterbalance the user's weight, largely by locating heavy electrical cells (110) or batteries, and chargers (120) aft of the user's center of gravity. In further ballasting, the heavy electrical chargers are also mounted lower than the level of the front and back wheel axles, thereby lowering the center of gravity. As a final stability enhancement, oversized drive wheels (140) and caster-mounted trailing wheels (150) are installed. The resultant high level of stability allows a user to exploit the chair's drive and maneuvering system even while standing upright.

To operate the system, the user sits on the seat (35) and fastens the support belt (32) around his/her waist. In this configuration, the unit may be used after the manner of a conventional powered wheelchair, control being accomplished through an armrest-mounted control console (100).

Referring to FIG. 7, the control console incorporates an on/off switch, a joy stick (104) a speed control knob (102) and a seat-lift control switch (103). Pushing the joystick (104) forward causes the unit to go forward. Pulling the joystick (104) back causes the unit to move backwards. Tilting the joystick (104) left or right causes the unit to turn left or right, respectively. Because the drive wheels (140) operate independently, and the rear wheels (150) are on casters, the system has an exceptionally tight turning radius, and the user can, even when not moving forward or back, twist in place, twisting the chair left or right about a vertical axis that approximates his/her bodily axis. Speed of the drive motors (145) and wheels (140) is governed via a speed control knob.

In that the control console (100), as do the consoles on most previously extant art, extends forward from an armrest (38), it can, potentially, become an obstruction to convenient approach to tables, desks, washbasins, etc. In order to defeat this potential shortcoming, the console (100) is mounted on an arm (99) that the user can swing downward in a pitching motion, from the horizontal to a vertical position (105), and that also can twist about its own axis in a rolling motion, (105) thereby reorienting the joystick (104) to outboard of the armrest (38). These options allow the control console (100) to be moved to an out-of-the-way, but still accessible position, thus facilitating closer and more convenient approach to tables, desks, wash basins and other essential working surfaces while still allowing the user convenient control access.

Figure 2:
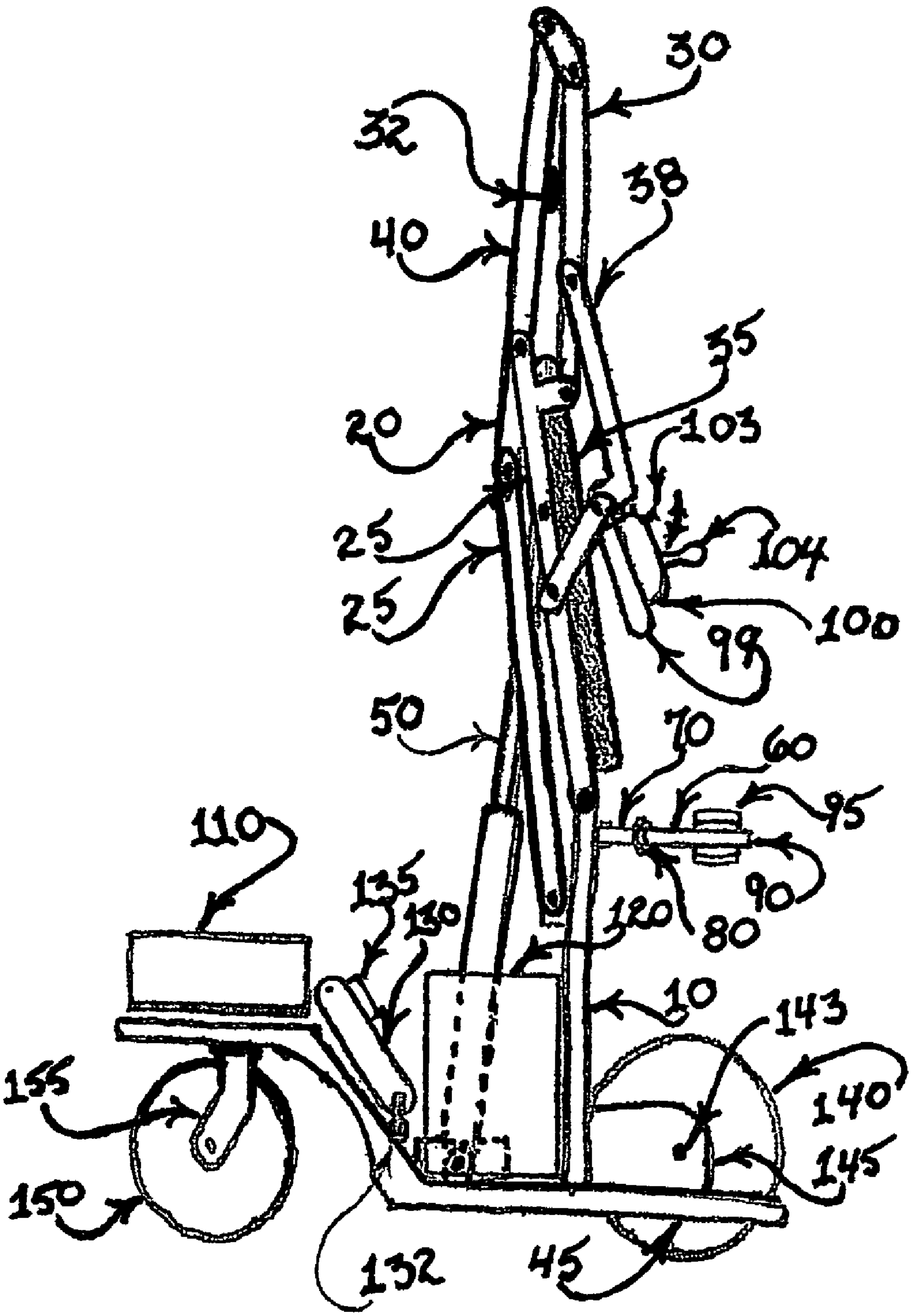
FIG. 2 is a side view of the device in standing configuration. Both right hand wheels and the right hand leg brace are removed to present a more informative picture

Referring to FIG. 2, to transition to a standing orientation, the user plants his/her feet firmly on the foot rest (45) and twists the leg brace distal shafts (60) to their closed position in front of his/her shins. (Also see FIG. 6.) This locks the user's lower legs into position for supporting an upright posture. Then, the user toggles the chair lift switch (103) to "standing" position causing the linear actuator (50) to extend, raising the back edge of the seat (35) from an essentially horizontal position to an essentially vertical position, thereby and causing the FIG. 1 rectangular lift structure, composed of elements (10), (20) and (25), to extend its dimensions between two diagonal corners, essentially forming a parallelogram, until, ultimately, it effectively collapses upon itself closing the two long sides (25) against each other, in the full vertical position.

Because the backrest (30) is suspended from an extension support (40) that is, essentially, an extension of the lift frame short side, aft, (20), the backrest (30) maintains an essentially vertical orientation throughout the transition from "sitting" (FIG. 1) to "standing" (FIG. 2). The user is lifted by the seat (35) and backrest (30) swinging upward and forward, and he/she is held snugly against the seat (35) and backrest (30) by the support belt (32). This lift system based on a linear actuator pushing a collapsing parallelogram offers significant technological advancement in its inherent simplicity and commensurately lower production cost.

The unit draws operating power from one or more long-life electrical cells or batteries (110) that need periodic recharging. To accomplish this, the user parks the unit near a normal household electrical outlet, extends the electrical power cord (132), and plugs it into the outlet. While the cord is plugged in to an electrical outlet, the electrical safety interlock (135) will not allow the drive motors (145) to operate, thereby preventing damage what would occur, should the user inadvertently move the system, under power, away from the electrical outlet while the cord (132) is still plugged in to the outlet.

Figure 3:
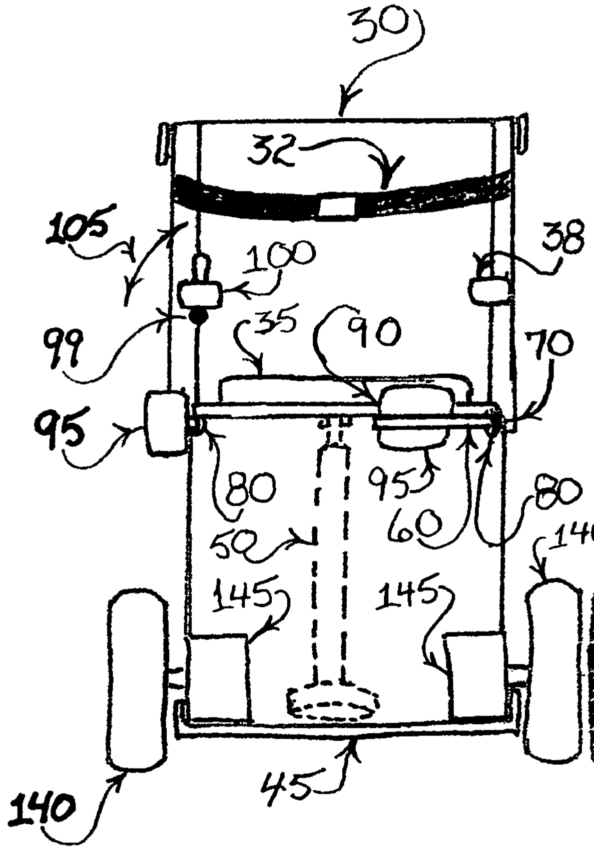
FIG. 3 is a front view of the device with the linear actuator wholly illustrated inclusive of its hidden parts, depicted by dotted lines. The user's left leg brace is shown closed. The user's right leg brace is shown open.

FIGS. 3 and 4 provide front and rear views of the unit and components previously addressed, with special attention to the view of the linear actuator.

FIGS. 5 and 6 display a leg brace with multiple mounting holes (75) by which it may be judiciously attached to the wheel chair in a position to provide maximum comfort and support for the user. Also depicted is the interface (80) between the proximal shaft (70) and distal shaft (60) and the brace axle (85) upon which the distal shaft (60) rotates between its open position (FIG. 5) and its closed position *(FIG. 6). To deploy the leg brace, the user takes a seat in the chair, and plants his/her feet firmly on the foot rest [FIGS. 1 and 2, item (45)]. The user then seizes the end of the distal shaft (60) at the leg-brace pad (95) and pulls it upward and back toward the chair seat (35). As the user continues to pull and turn it, the shaft will rotate on the brace axle (85) at the interface (80) until it attains a closed configuration as in FIG. 6, with the leg-brace pad (95) snugly against the users shin. If the brace fits too loosely or too tightly, it may be adjusted by selecting from the multiple mounting holes (75) provided in the proximal shaft (70). After the leg braces (90) have been initially adjusted for a given user, the braces (90) may be opened and closed repeatedly without disturbing the adjusted setting. The interface (80) is preferably fitted under sufficient compression to remain in whatever position the user places it. Alternatively, a tensioning device may be incorporated or the interface may have teeth or interlocking notches added to further promote rigidity at the user's discretion.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A motorized wheelchair with stand-up capability comprising:

front drive wheels comprising a plurality of independently controllable drive wheels, each having an axle centerline in the vicinity of the arches of a user's feet;

drive motors to power said plurality of independently controllable drive wheels;

one or more caster mounted rear wheels;

a seat and a backrest;

a lift mechanism to lift and lower said seat and said backrest;

said lift mechanism comprising lift frames that transition said seat and said backrest from a seated position wherein said lift mechanism is oriented along an essentially horizontal axis of said motorized wheelchair to a standing up position wherein said lift mechanism is in an essentially collapsed parallelogram configuration oriented along an essentially vertical axis of said motorized wheelchair;

a telescoping cylinder connected to said seat such that a lifting force pushes said seat from an essentially horizontal position to an essentially vertical position that causes the transition of said lift mechanism from the essentially horizontal axis to the essentially vertical axis of said motorized wheel chair and transitions said lifting mechanism from the essentially horizontal orientation to said essentially collapsed parallelogram orientation;

at least one onboard energy source to power said drive motors and said lift mechanism;

a leg brace system to hold the user's legs in straight extended position, such that said leg brace system provides support to the user's legs when in standing position, said leg brace system comprising at least one proximal shaft and at least one distal shaft, said at least one proximal shaft and said at least one distal shaft meeting end to end at an interface of essentially forty-five degrees;

an axle connecting said at least one proximal shaft and said at least one distal shaft at said interface, said axle penetrating the interface at an angle essentially normal to the interface, such that rotation of said at least one proximal shaft and said at least one distal shaft relative to one another causes said at least one proximal shaft and said at least one distal shaft to transition between relative angles of essentially zero degrees for an open configuration, to essentially ninety degrees for a closed position;

a brace pad attached to the other end of said at least one distal shaft, such that when said at least one distal shaft is in a retracted position, said brace pad occupies a point interior to the essentially ninety degree angle formed by said at least one proximal shaft and said at least one distal shaft; and a means for adjustably mounting said leg brace system to said motorized wheelchair.

2. A motorized wheelchair with stand-up capability as in claim 1, wherein said at least one onboard energy source comprises one or more electrical power cells.

3. A motorized wheelchair with stand-up capability as in claim 1, wherein said lift mechanism comprises an essentially upward extending portion, with said backrest being integrated into said essentially upward extending portion.

4. A motorized wheelchair with stand-up capability as in claim 1, further comprising:

at least one onboard electrical power cell charger;

at least one extendable and retractable charger cord compatible with standard household electrical outlets; and at least one safety interlock to prevent use of said drive motors while said at least one extendable and retractable charger cord is plugged into an electrical power receptacle.

5. A motorized wheelchair with stand-up capability as in claim 1, wherein said telescoping cylinder comprises at least one linear actuator.

6. A motorized wheelchair with stand-up capability as in claim 1, further comprising at least one armrest and at least one armrest mounted control console, wherein said at least one armrest mounted console can be folded down in a pitching motion or turned outward in a rolling motion.

7. A motorized wheelchair with stand-up capability as in claim 1, further comprising a means for securing the user's body firmly against said seat or said backrest of said motorized wheelchair.

8. A motorized wheelchair with stand-up capability as in claim 1, wherein no portion, part or structure of said motorized wheelchair with stand-up capability extends forward beyond an essentially vertical plane disposed at a front end portion of a footrest provided on said motorized wheelchair with stand-up capability, unless that portion, part or structure of said motorized wheelchair is retractable to a plane aft of said essentially vertical plane.

9. A method of forming motorized wheelchair with stand-up capability comprising:

providing front drive wheels comprising a plurality of independently controllable drive wheels, each having an axle centerline in the vicinity of the arches of a user's feet;

providing drive motors to power said plurality of independently controllable drive wheels;

providing one or more caster mounted rear wheels;

providing a seat and a backrest;

providing a lift mechanism to lift and lower said seat and said backrest;

said lift mechanism comprising lift frames that transition said seat and said backrest from a seated position wherein said lift mechanism is oriented along an essentially horizontal axis of said motorized wheelchair to a standing up position wherein said lift mechanism is in an essentially collapsed parallelogram configuration oriented along an essentially vertical axis of said motorized wheelchair;

providing a telescoping cylinder connected to said seat such that a lifting force pushes said seat from an essentially horizontal position to an essentially vertical position that causes the transition of said lift mechanism from the essentially horizontal axis to the essentially vertical axis of said motorized wheel chair and transitions said lifting mechanism from the essentially horizontal orientation to said essentially collapsed parallelogram orientation;

providing at least one onboard energy source to power said drive motors and said lift mechanism;

providing a leg brace system to hold the user's legs in straight extended position, such that said leg brace system provides support to the user's legs when in standing position, said leg brace system comprising at least one proximal shaft and at least one distal shaft, said at least one proximal shaft and said at least one distal shaft meeting end to end at an interface of essentially forty-five degrees;

providing an axle to connect said at least one proximal shaft and said at least one distal shaft at said interface, said axle penetrating the interface at an angle essentially normal to the interface, such that rotation of said at least one proximal shaft and said at least one distal shaft relative to one another causes said at least one proximal shaft and said at least one distal shaft to transition between relative angles of essentially zero degrees for an open configuration, to essentially ninety degrees for a closed position;

providing a brace pad attached to the other end of said at least one distal shaft, such that when said at least one distal shaft is in a retracted position, said brace pad occupies a point interior to the essentially ninety degree angle formed by said at least one proximal shaft and said at least one distal shaft; and providing a means for adjustably mounting said leg brace system to said motorized wheelchair.

10. A method of forming motorized wheelchair with stand-up capability as in claim 9, wherein the provided at least one onboard energy source comprises one or more electrical power cells.

11. A method of forming motorized wheelchair with stand-up capability as in claim 9, wherein the provided lift mechanism comprises an essentially upward extending portion, with said backrest being integrated into said essentially upward extending portion.

12. A method of forming motorized wheelchair with stand-up capability as in claim 9, further comprising:

providing at least one onboard electrical power cell charger;

providing at least one extendable and retractable charger cord compatible with standard household electrical outlets; and providing at least one safety interlock to prevent use of said drive motors while said at least one extendable and retractable charger cord is plugged into an electrical power receptacle.

13. A method of forming motorized wheelchair with stand-up capability as in claim 9, wherein the provided telescoping cylinder comprises a linear actuator.

14. A method of forming motorized wheelchair with stand-up capability as in claim 9, further comprising:

providing at least one armrest and at least one armrest mounted control console, wherein said at least one armrest mounted console can be folded down in a pitching motion or turned outward in a rolling motion.

15. A method of forming motorized wheelchair with stand-up capability as in claim 9, further comprising:

providing a means for securing the user's body firmly against said seat or said backrest of said motorized wheelchair.

16. A motorized wheelchair with stand-up capability comprising:

front drive wheels comprising a plurality of independently controllable drive wheels, each having an axle centerline in the vicinity of the arches of a user's feet;

drive motors to power said plurality of independently controllable drive wheels;

one or more caster mounted rear wheels;

a seat and a backrest;

a lift mechanism to lift and lower said seat and said backrest, said lift mechanism comprising lift frames that transition said seat and said backrest from a seated position wherein said lift mechanism is oriented along an essentially horizontal axis of said motorized wheelchair to a standing up position wherein said lift mechanism is in an essentially collapsed parallelogram configuration oriented along an essentially vertical axis of said motorized wheelchair, and wherein said lift mechanism comprises an essentially upward extending portion, with said backrest being integrated into said essentially upward extending portion;

a telescoping cylinder connected to said seat such that a lifting force pushes said seat from an essentially horizontal position to an essentially vertical position that causes the transition of said lift mechanism from the essentially horizontal axis to the essentially vertical axis of said motorized wheel chair and transitions said lifting mechanism from the essentially horizontal orientation to said essentially collapsed parallelogram orientation, wherein said telescoping cylinder comprises at least one linear actuator;

at least one onboard energy source to power said drive motors and said lift mechanism, wherein said at least one onboard energy source comprises one or more electrical power cells;

a leg brace system to hold the user's legs in straight extended position, such that said leg brace system provides support to the user's legs when in standing position, said leg brace system comprising at least one proximal shaft and at least one distal shaft, said at least one proximal shaft and said at least one distal shaft meeting end to end at an interface of essentially forty-five degrees;

an axle connecting said at least one proximal shaft and said at least one distal shaft at said interface, said axle penetrating the interface at an angle essentially normal to the interface, such that rotation of said at least one proximal shaft and said at least one distal shaft relative to one another causes said at least one proximal shaft and said at least one distal shaft to transition between relative angles of essentially zero degrees for an open configuration, to essentially ninety degrees for a closed position;

a brace pad attached to the other end of said at least one distal shaft, such that when said at least one distal shaft is in a retracted position, said brace pad occupies a point interior to the essentially ninety degree angle formed by said at least one proximal shaft and said at least one distal shaft;

a means for adjustably mounting said leg brace system to said motorized wheelchair;

at least one onboard electrical power cell charger;

at least one extendable and retractable charger cord compatible with standard household electrical outlets;

at least one safety interlock to prevent use of said drive motors while said at least one extendable and retractable charger cord is plugged into an electrical power receptacle;

at least one armrest and at least one armrest mounted control console, wherein said at least one armrest mounted console can be folded down in a pitching motion or turned outward in a rolling motion;

a means for securing the user's body firmly against said seat or said backrest of said motorized wheelchair; and wherein no portion, part or structure of said motorized wheelchair with stand-up capability extends forward beyond an essentially vertical plane disposed at a front end portion of a footrest provided on said motorized wheelchair with stand-up capability, unless that portion, part or structure of said motorized wheelchair is retractable to a plane aft of said essentially vertical plane.

17. A method of forming motorized wheelchair with stand-up capability comprising:

providing front drive wheels comprising a plurality of independently controllable drive wheels, each having an axle centerline in the vicinity of the arches of a user's feet;

providing drive motors to power said plurality of independently controllable drive wheels;

providing one or more caster mounted rear wheels;

providing a seat and a backrest;

providing a lift mechanism to lift and lower said seat and said backrest, said lift mechanism comprising lift frames that transition said seat and said backrest from a seated position wherein said lift mechanism is oriented along an essentially horizontal axis of said motorized wheelchair to a standing up position wherein said lift mechanism is in an essentially collapsed parallelogram configuration oriented along an essentially vertical axis of said motorized wheelchair, and wherein said lift mechanism comprises an essentially upward extending portion, with said backrest being integrated into said essentially upward extending portion;

providing a telescoping cylinder connected to said seat such that a lifting force pushes said seat from an essentially horizontal position to an essentially vertical position that causes the transition of said lift mechanism from the essentially horizontal axis to the essentially vertical axis of said motorized wheel chair and transitions said lifting mechanism from the essentially horizontal orientation to said essentially collapsed parallelogram orientation, wherein said telescoping cylinder comprises a linear actuator;

providing at least one onboard energy source to power said drive motors and said lift mechanism, wherein said at least one onboard energy source comprises one or more electrical power cells;

providing a leg brace system to hold the user's legs in straight extended position, such that said leg brace system provides support to the user's legs when in standing position, said leg brace system comprising at least one proximal shaft and at least one distal shaft, said at least one proximal shaft and said at least one distal shaft meeting end to end at an interface of essentially forty-five degrees;

providing an axle to connect said at least one proximal shaft and said at least one distal shaft at said interface, said axle penetrating the interface at an angle essentially normal to the interface, such that rotation of said at least one proximal shaft and said at least one distal shaft relative to one another causes said at least one proximal shaft and said at least one distal shaft to transition between relative angles of essentially zero degrees for an open configuration, to essentially ninety degrees for a closed position;

providing a brace pad attached to the other end of said at least one distal shaft, such that when said at least one distal shaft is in a retracted position, said brace pad occupies a point interior to the essentially ninety degree angle formed by said at least one proximal shaft and said at least one distal shaft;

providing a means for adjustably mounting said leg brace system to said motorized wheelchair;

providing at least one onboard electrical power cell charger;

providing at least one extendable and retractable charger cord compatible with standard household electrical outlets;

providing at least one safety interlock to prevent use of said drive motors while said at least one extendable and retractable charger cord is plugged into an electrical power receptacle;

providing at least one armrest and at least one armrest mounted control console, wherein said at least one armrest mounted console can be folded down in a pitching motion or turned outward in a rolling motion; and providing a means for securing the user's body firmly against said seat or said backrest of said motorized wheelchair.

* * * * *